United States Patent
John et al.

(10) Patent No.: US 12,497,965 B2
(45) Date of Patent: Dec. 16, 2025

(54) REFRIGERANT COOLED ELECTRIC MOTOR

(71) Applicant: Garrett Transportation I Inc., Torrance, CA (US)

(72) Inventors: Poomkuzhimannil John, Bangalore (IN); Suryakant Gupta, Bangalore (IN); Vignesh K K, Bangalore (IN); Kishmor Kumar K, Bangalore (IN)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 18/638,885

(22) Filed: Apr. 18, 2024

(65) Prior Publication Data
US 2025/0283469 A1    Sep. 11, 2025

(30) Foreign Application Priority Data

Mar. 6, 2024   (IN) .............................. 202411015880

(51) Int. Cl.
| | |
|---|---|
| *F04C 29/04* | (2006.01) |
| *F04D 13/06* | (2006.01) |
| *F04D 29/42* | (2006.01) |
| *F04D 29/58* | (2006.01) |
| *F25B 1/04* | (2006.01) |

(Continued)

(52) U.S. Cl.
CPC ............ *F04C 29/045* (2013.01); *F04D 13/06* (2013.01); *F04D 29/4206* (2013.01); *F04D 29/58* (2013.01); *F04D 29/5806* (2013.01); *F25B 1/04* (2013.01); *F25B 31/006* (2013.01); *H02K 5/20* (2013.01)

(58) Field of Classification Search
CPC .... F04C 29/045; F04D 13/06; F04D 29/4206; F04D 29/58; F04D 29/5806; F25B 1/04; F25B 31/006; H02K 5/20
See application file for complete search history.

(56) References Cited

U.S. PATENT DOCUMENTS

| | | | |
|---|---|---|---|
| 5,359,863 A | * 11/1994 | Lewis | F25B 45/00 62/149 |
| 5,533,875 A | * 7/1996 | Crum | F04C 29/045 418/94 |
| 7,181,928 B2 | 2/2007 | de Larminat | |

(Continued)

FOREIGN PATENT DOCUMENTS

| | | |
|---|---|---|
| CN | 112334664 A | 2/2021 |
| DE | 102013215465 B4 | 2/2022 |
| GB | 1434226 A | 5/1976 |

*Primary Examiner* — Mary A Davis
(74) *Attorney, Agent, or Firm* — BelayIP

(57) ABSTRACT

An electric motor including a motor housing having an inlet for receiving a refrigerant and a first outlet for coupling the refrigerant to a centrifugal compressor, an electric motor including a stator, a rotor and a shaft mechanically coupled to the rotor, an inner sleeve disposed within the motor housing for mechanically restraining the electric motor and wherein a flow passage is formed between an outer surface of the inner sleeve and an inner surface of the motor housing, and a flow deflector positioned within the motor housing to create a metered channel between the flow deflector and the inner sleeve such that a portion of the refrigerant flows within the inner sleeve and through the electric motor.

20 Claims, 5 Drawing Sheets

(51) Int. Cl.
 *F25B 31/00* (2006.01)
 *H02K 5/20* (2006.01)

(56) References Cited

U.S. PATENT DOCUMENTS

| | | |
|---|---|---|
| 7,394,175 B2 | 7/2008 | McAuliffe et al. |
| 8,783,135 B2 | 7/2014 | Knoth et al. |
| 10,724,545 B2 | 7/2020 | Stefanovic et al. |
| 11,156,231 B2 | 10/2021 | Leighty et al. |
| 11,274,679 B2 * | 3/2022 | Sun .................... F04D 29/5806 |
| 2014/0140867 A1 * | 5/2014 | Bonnefoi .............. F04C 29/045 |
| | | 417/365 |
| 2021/0285462 A1 | 9/2021 | Zug et al. |
| 2022/0243651 A1 | 8/2022 | Jin |

* cited by examiner

REFRIGERANT COOLED ELECTRIC MOTOR

CROSS REFERENCE TO RELATED APPLICATION

The present application claims benefit of prior filed India Provisional Patent Application No. 202411015880, filed Mar. 6, 2024, which is hereby incorporated by reference herein in its entirety.

TECHNICAL FIELD

The present disclosure generally relates to an electric motor cooling apparatus and, more particularly, relates to a system for providing thermal control for an electric motor. More specifically, aspects of the present disclosure relate to systems, methods and devices for providing a split flow refrigerant arrangement for simultaneously cooling an electric motor housing and electric motor stators by employing flow deflectors to maintain optimal refrigerant flow while minimizing windage loss to the electric motor.

BACKGROUND

The ever increasing use of electric motors in automotive applications continuously introduces new demands for high power, high efficiency and high power density electrical motor drives. For example, some automotive compressors, such as turbochargers, superchargers, or other fluid compression devices can include an electric motor that is operably coupled to the same shaft that supports a compressor wheel, turbine wheel, etc. The electric motor may drivingly rotate the shaft, for example, to assist a turbine stage of the device. While electric motors have a clear efficiency advantage over traditional combustion engines, electric motors still generate heat during operation. For automotive applications, electric motors operate at high voltages and typically draw high levels of electric current, causing internal heat generation. Likewise, in an internal combustion engine setting, these electric motors may be subject to high ambient temperatures resulting from the combustion engine operation, further increasing the internal and external temperatures of the electric motor.

To control electric motor temperature in high temperature applications various cooling strategies have typically been used, such as augmented air cooling and liquid cooling. Augmented air cooling can employ high performance fans, such as axial or centrifugal fans, to push large volumes of air over the motor, increasing heat removal, along with optimized airflow channels. Liquid cooling can employ direct liquid cooling where coolant channels are integrated directly into the stator and rotor windings, and indirect liquid cooling where a coolant jacket surrounds the motor housing, transferring heat to an external radiator or heat exchanger. However in modern automotive electric motor applications, such as e-machine assisted turbocharger applications, as higher power output from the electric motors is demanded and the available space for the motor becomes increasingly constrained, these traditional cooling strategies are becoming increasingly ineffective. Increased air density within the stator and rotor can result in more drag and higher rotational energy losses, thereby rendering augmented air cooling less effective. Thus, it is desirable to provide systems and methods to ensure efficient electric motor cooling in high voltage and high temperature applications while overcome the aforementioned challenges. Other desirable features and characteristics of the present disclosure will become apparent from the subsequent detailed description and the appended claims, taken in conjunction with the accompanying drawings and this background discussion.

BRIEF SUMMARY

Disclosed herein are fluid compression and motor control methods and systems and related electrical systems for provisioning such systems, methods for making and methods for operating such systems, and motor vehicles and other equipment such as aircraft, ships, wind turbines and other electric vehicles equipped with onboard propulsion systems. By way of example, and not limitation, there are presented various embodiments of systems for providing a refrigerant cooled electric motor having balanced refrigerant flows to maximize heat transfer and reduce windage loss.

In accordance with an aspect of the present disclosure, an electric motor for driving a centrifugal compressor including a motor housing having an inlet for receiving a refrigerant and a first outlet for coupling the refrigerant to the centrifugal compressor, an electric motor including a stator, a rotor and a shaft mechanically coupled to the rotor, an inner sleeve disposed within the motor housing for mechanically restraining the electric motor and wherein a flow passage is formed between an outer surface of the inner sleeve and an inner surface of the motor housing, and a flow deflector positioned within the motor housing to create a metered channel between the flow deflector and the inner sleeve such that a portion of the refrigerant flows within the inner sleeve and through the electric motor.

In accordance with another aspect of the present disclosure, a method of cooling an electric motor in a centrifugal compressor including receiving a refrigerant flow from an evaporator into a motor housing, providing an inner sleeve within the motor housing for supporting the electric motor, and providing a metered channel within the inner sleeve such that a first portion of the refrigerant flow is routed through a first flow passage between an inner surface of the motor housing and an outer surface of the inner sleeve and a second portion of the refrigerant flow is routed into the inner sleeve and through the electric motor.

In accordance with another aspect of the present disclosure, a centrifugal compressor including an impeller disposed within an impeller housing for compressing a refrigerant, a motor housing mechanically coupled to the impeller housing, wherein the motor housing includes an inlet for receiving a refrigerant flow from an evaporator, an electric motor having a stator, a rotor and a shaft, wherein the shaft is mechanically coupled to the impeller and the rotor, an inner sleeve disposed within the motor housing for supporting the electric motor, wherein a first flow passage is formed between an inner surface of the motor housing and an outer surface of the inner sleeve, a flow deflector disposed within the motor housing such that a metered channel is formed between the inner sleeve and the flow deflector such that a first portion of the refrigerant flow is routed through the first flow passage and a second portion of the refrigerant flow is routed through the electric motor, a first outlet for coupling the first portion of the refrigerant flow from the first flow passage to the impeller housing, and a second outlet for coupling the second portion of the refrigerant flow from an interior volume of the inner sleeve to the impeller housing

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
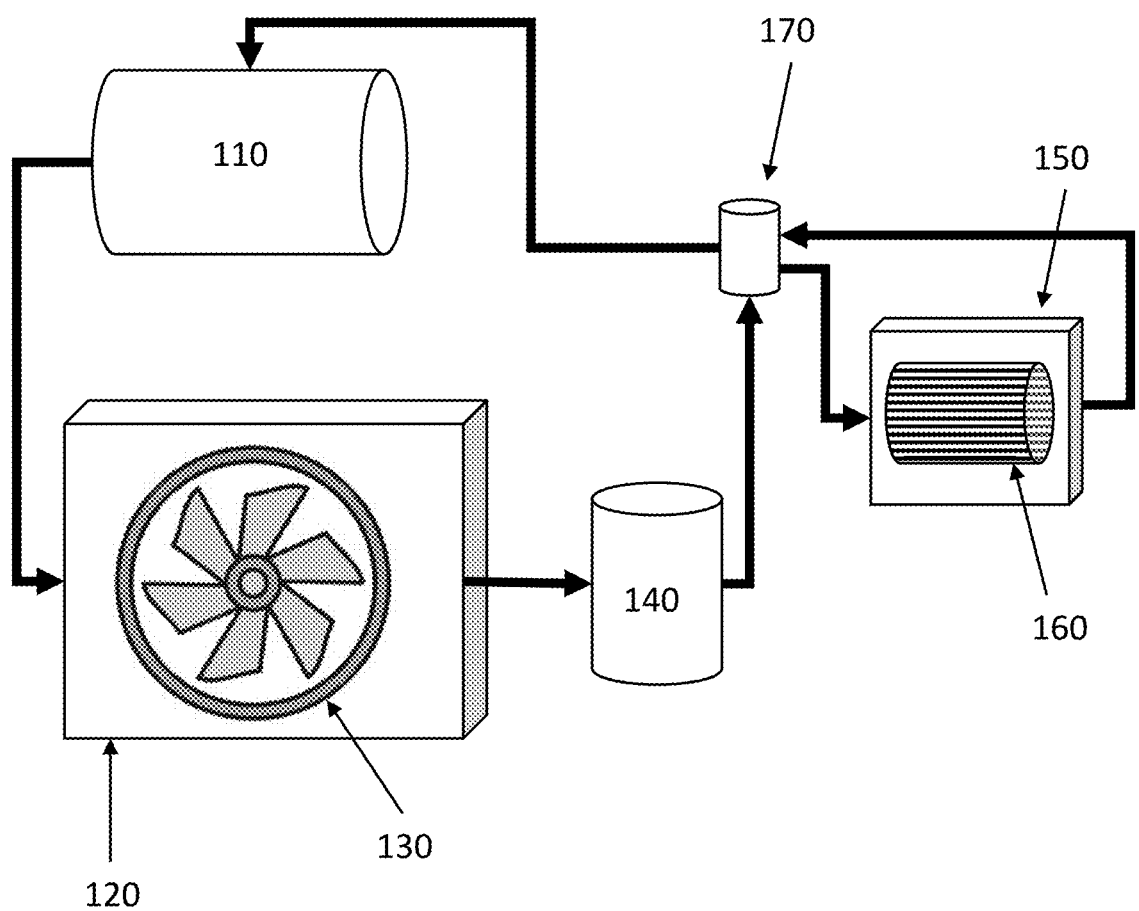
FIG. 1 illustrates an exemplary environment for application of a refrigerant cooled electric motor according to exemplary embodiments of the present disclosure.

Turning now to FIG. 1, an exemplary environment 100 for application of a refrigerant cooled electric motor according to exemplary embodiments of the present disclosure is shown. The exemplary environment 100 can be an automotive air conditioning system including a compressor 110, a condenser 120, a condenser fan 130, a refrigerant drier 140, a evaporator 150, an evaporator fan 160, and an expansion valve 170.

The compressor 110 in the exemplary automotive air conditioning system is a device used to compress a refrigerant gas. In some exemplary embodiments, the compressor 110 can be a centrifugal compressor using an electric motor to drive one or more impellers to increase a pressure of an incoming refrigerant and direct this high velocity refrigerant into a diffuser. The diffuser works to increase the pressure of the refrigerant. As the pressure of the refrigerant increases, so does the temperature of the refrigerant. This high-pressure, high temperature, refrigerant is then coupled from the compressor 110 to the condenser 120.

The condenser 120 is a heat exchanger configured to transfer heat from the high pressure, high temperature refrigerant to the ambient environment. The refrigerant is channeled through a number of thermally conductive tubes equipped with external thermally conductive fins. Air, or another coolant, can be forced through the condenser and across the thermally conductive tubes and fins, in part by the co-located condenser fan 130, to aid in the transfer of the thermal energy from the refrigerant to the flowing air. This heat exchange condenses the refrigerant back into a liquid, significantly reducing its temperature. This liquid refrigerant is then coupled to a refrigerant dryer 140.

The refrigerant dryer 140 is configured to filter out moisture and other contaminants in the air conditioning system. The refrigerant dryer 140 typically includes a desiccant dehumidifier, such as silica gel beads, to absorb moisture that has infiltrated the air conditioning system. In addition, the refrigerant dryer 140 can include a filter to trap debris and an oil separator for removing excess compressor oil from the refrigerant. After filtering by the refrigerant dryer 140, the high pressure liquid refrigerant is coupled to the expansion valve 170.

The expansion valve 170 is configured to transition the high pressure liquid refrigerant to a lower pressure gas by regulating the flow of the high pressure refrigerant into the evaporator 150 and to prevent any sudden drop in pressure of the refrigerant to ensure that the refrigerant does not reach other components, such as the compressor 110, in a liquid state. The compressed and cooled liquid refrigerant undergoes a controlled pressure drop through the expansion valve 170, causing partial evaporation and a significant absorption of heat from the surrounding air in the evaporator 170. The expansion valve 170 can be an electronically controlled expansion valve (EEV) which uses electronic sensors to detect the heat and pressure of the refrigerant in order to efficiently manage refrigerant flow. Alternatively, the expansion value can be a thermostatic expansion valve (TEC) which uses a sensor bulb to monitor the temperature of the refrigerant and to regulate the refrigerant flow accordingly.

The cold, low pressure refrigerant is then coupled to an evaporator 150. The evaporator 150 is a heat exchanger consisting of a network of thermally conductive tubes and fins. In an automotive air conditioning system, the evaporator 150 is typically located within a vehicle cabin and is installed with an evaporator fan 160 for forcing air through the thermally conductive tubes and fins which extract heat from this airflow. The cooled airflow is then distributed through the vehicle cabin. The low-pressure refrigerant absorbs heat from the forced air as it travels through the evaporator 150 and is then coupled back to the compressor 110 via the expansion valve 170 and re-enters the compressor 110 completing the cycle. The heat load and pressure of the refrigerant from the evaporator 150 is used to regulate the expansion valve 170 to control the pressure drop of the liquid refrigerant to the evaporator 150.

Figure 2:
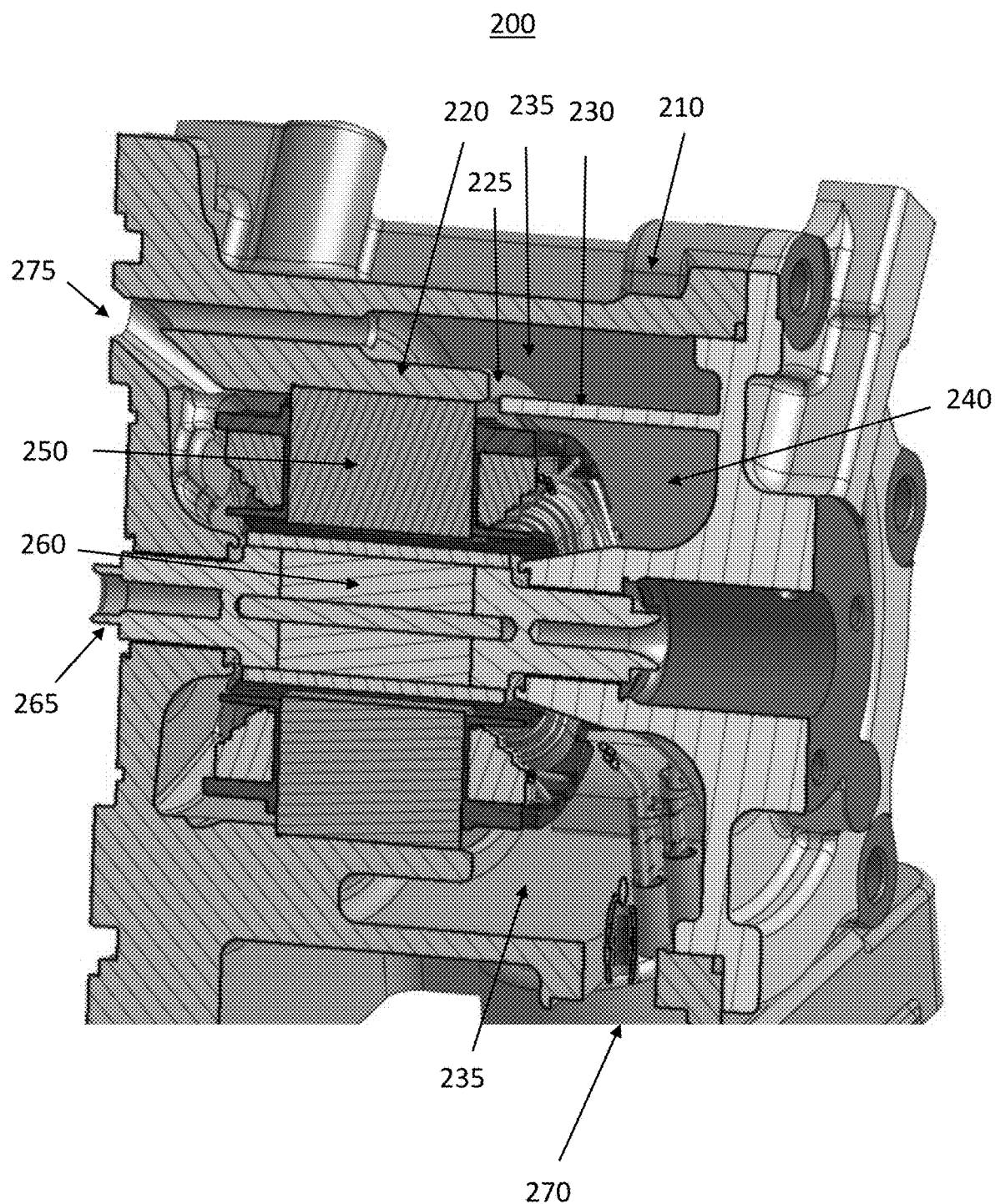
FIG. 2 shows an exemplary cross sectional view of a centrifugal compressor according to exemplary embodiments of the present disclosure.

Turning now to FIG. 2, an exemplary cross sectional view of an electric motor portion 200 of a centrifugal compressor according to exemplary embodiments of the present disclosure is shown. The exemplary electric motor portion 200 is a centrifugal compressor driven by an integrated electric motor. The centrifugal compressor includes an outer motor housing 210 and an inner sleeve 220 supporting the electric motor, wherein inner sleeve 220 can be an integral part of motor housing 210 or can be a separate part. The electric motor includes a stator 250 and a rotor 260 mechanically coupled to a drive shaft 265. The drive shaft 265 drives an impeller of the centrifugal compressor (not shown).

Figure 3:
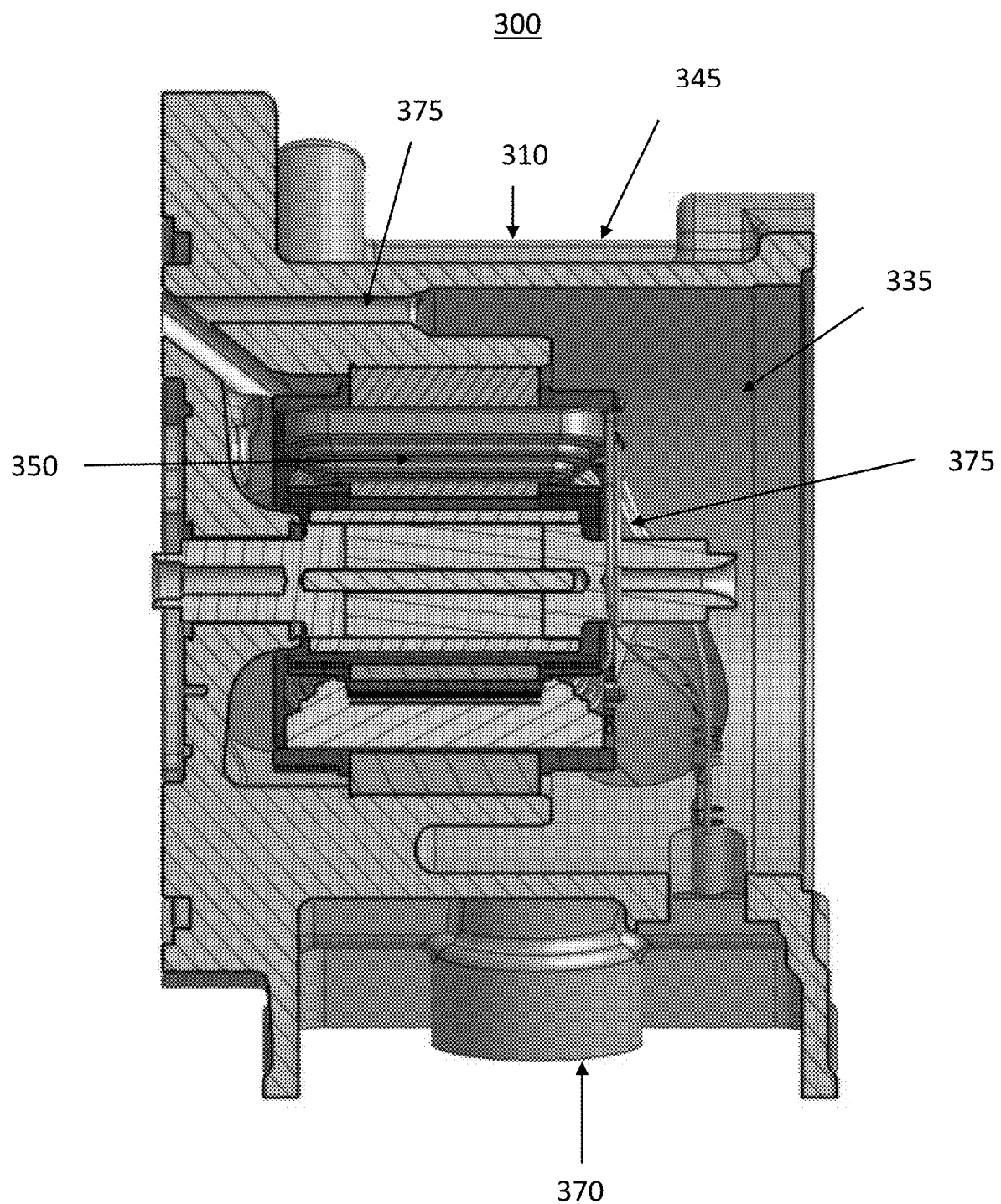
FIG. 3 shows another exemplary cross sectional view of a centrifugal compressor according to exemplary embodiments of the present disclosure.

Advantageously, the exemplary electric motor portion 200 of a centrifugal compressor is configured such that the electric motor is cooled by the incoming low pressure refrigerant from the evaporator 150 of FIG. 1. The direct refrigerant flow provides for better cooling performance than traditional liquid cooling. In addition, the exemplary flow split of refrigerant within the centrifugal compressor 200 enables increased heat transfer from inner & outer surface of stator 250. The electric motor portion 200 is configured such that the low pressure refrigerant is first routed into an outer flow passage 235 within the motor housing around the stator 250 and inner sleeve 220 via a flow inlet 270. The refrigerant flow is then split between the outer flow passage 235 and an inner flow passage 240. The flow split is regulated by the flow deflector 230. The flow deflector 230 is configured to create a metered channel 225 between the inner sleeve 220 and the flow deflector 230 such that a uniform regulated flow of refrigerant is coupled to the inner flow passage 240 to cool the inner surfaces of the stator 250. This split flow enables uniform stator 250 cooling by increases the heat transfer from the inner and outer surface of the stator 250. The heat gained as the refrigerant flow passes through the stator 250 further aids in vaporization of liquid refrigerants. Finally, the refrigerant in each of the split flow paths is coupled to the compressor intake (not shown) via separate outlet flow passages 275. The flow rate of the separate flow passages 275 can be further configured to regulate the flow rate each of the split flow paths by configuring the geometry of each of the spilt flow paths to regulate refrigerant flow. While the concept helps in evaporating any liquid refringent, such an advantage can be utilized especially during heat pump duty cycle to add super heat to the refrigerant through the electric winding heat rejection Turning now to FIG. 3, a cross sectional view of an exemplary electric motor portion 300 of a centrifugal compressor according to exemplary embodiments of the present disclosure is shown. The exemplary view is illustrative of the electric motor portion 300 absent the flow deflector 230 of FIG. 2. The low pressure refrigerant from the evaporator is coupled into the electric motor housing 310 via the flow inlet 370. The refrigerant then flows within the outer flow passage 335 and out a plurality of outlet flow passages 375 to the compressor intake (not shown). According to some exemplary embodiments, the refrigerant flow is split in response to a metered channel resulting from one or more flow deflectors (not shown) installed within the outer flow passage 335 to direct some refrigerant through the stator 350 as will be further described with respect to FIG. 4.

Figure 4:
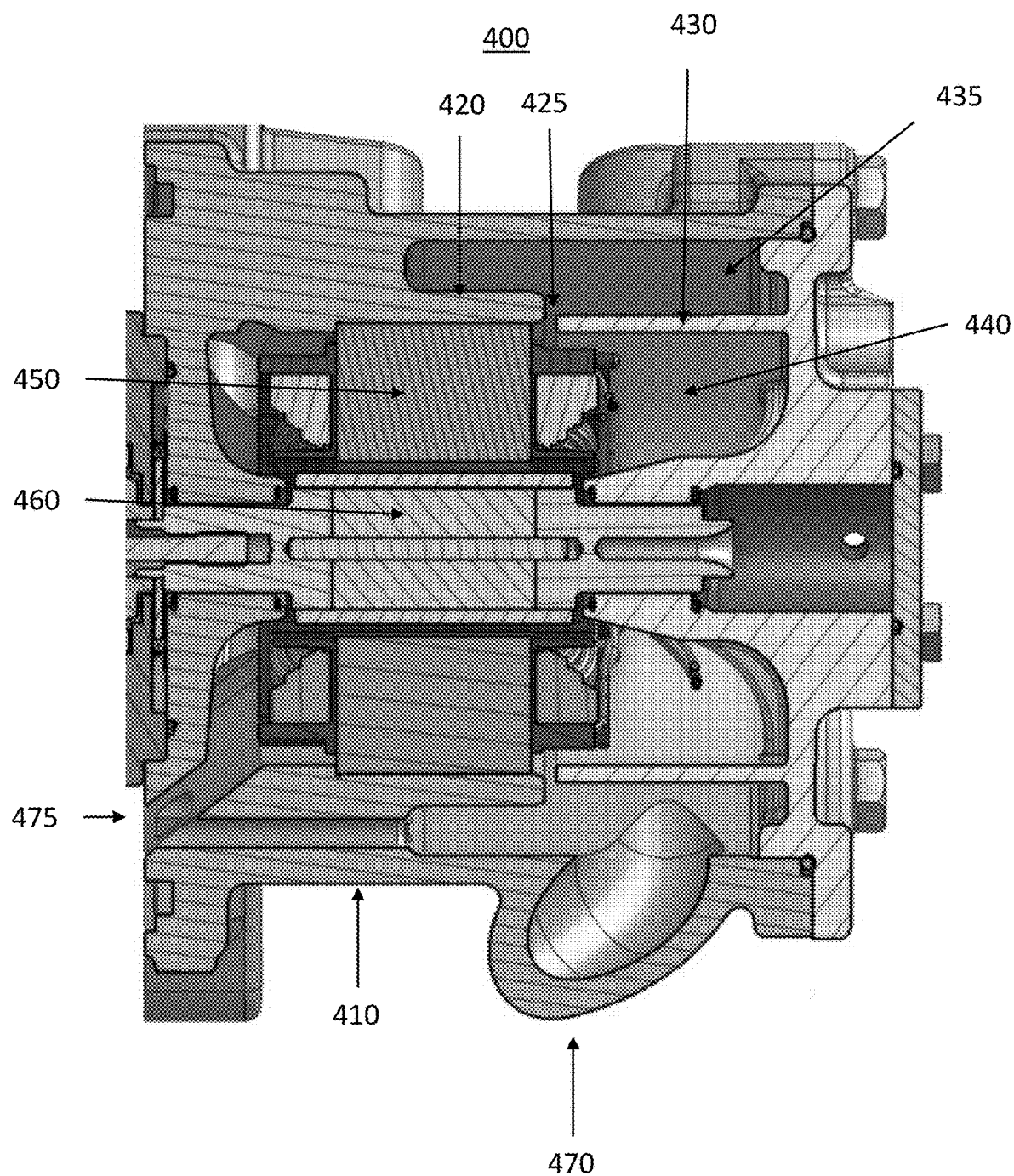
FIG. 4 shows an exemplary cross sectional view of a centrifugal compressor illustrative of the refrigerant flow deflectors according to exemplary embodiments of the present disclosure.

Turning now to FIG. 4, a cross sectional view of an exemplary electric motor portion 400 of a centrifugal compressor according to exemplary embodiments of the present disclosure is shown. The exemplary electric motor portion 400 is illustrative of a flow deflector 430 for providing a metered channel 425 from the outer flow passage 435 to the inner flow passage 440. The flow inlet 470, flow deflector 430, metered channel 425 and outlet flow passages 475 are configured such that an optimal refrigerant flow rate is provided through the stator 450 and along the outer surfaces of the rotor 460 to provide optimal cooling while minimizing drag on the spin of the rotor 460. In some exemplary embodiments, 5-10% of the low pressure refrigerant can be routed through the inner flow passage 440. This will also help in effective rotor cooling. The defector 430 provided within the electric motor portion 440 enables a higher flow through the outer flow passage 425 and a lower flow between the stator 450 and the rotor 460 to minimize windage loss. Furthermore the deflector 430 can be configured to act as a trap to prevent any liquid refrigerant from accumulating inside the stator 450.

Figure 5:
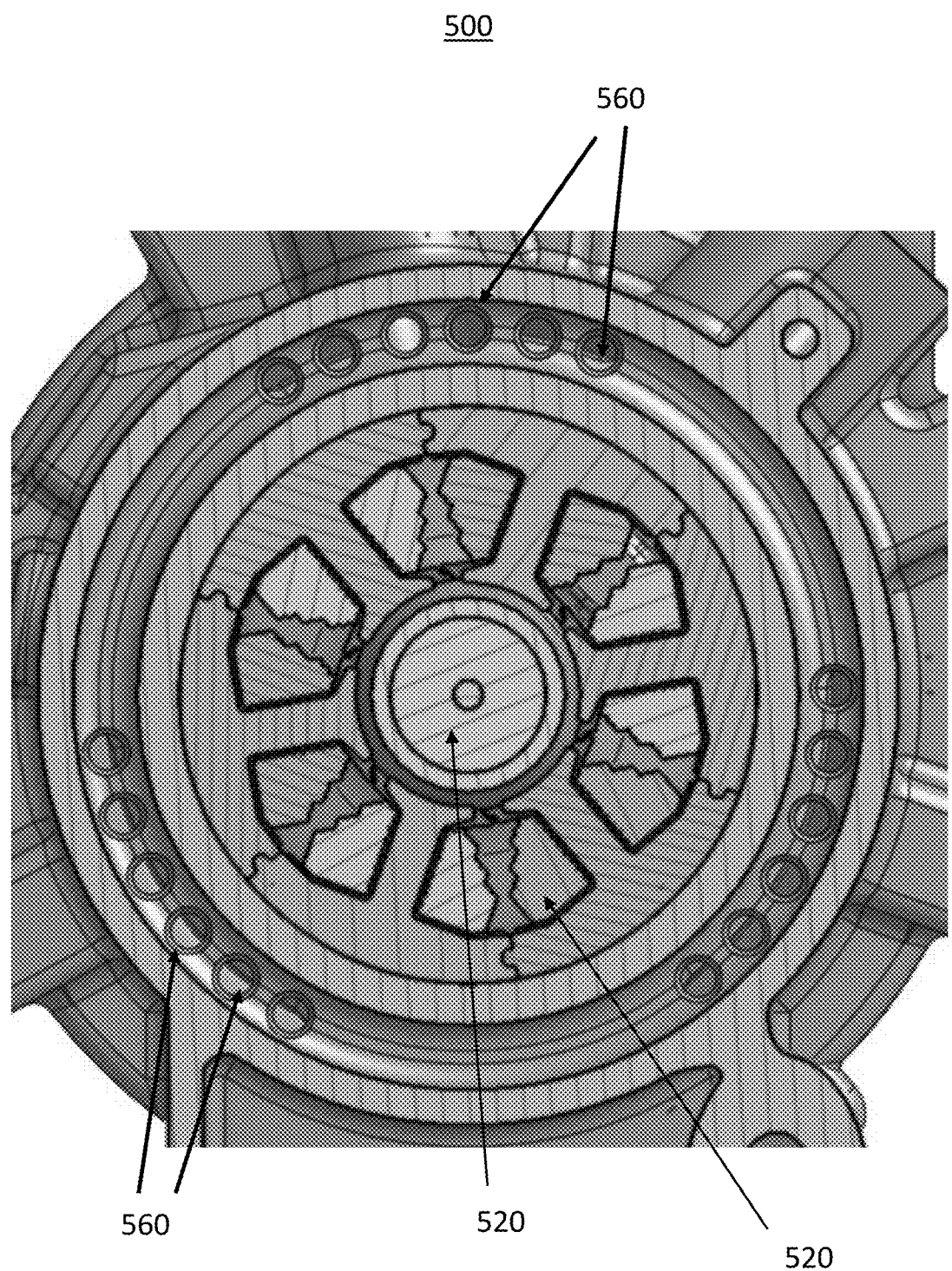
FIG. 5 shows an exemplary sectional view of a centrifugal compressor including refrigerant flow passages according to exemplary embodiments of the present disclosure.

Advantageously, the inner sleeve 420 is further configured to mechanically retain the electric motor. Since the inner sleeve 420 is at least partially mechanically isolated from the outer housing 410 of the electric motor portion 400, vibration from the electric motor can be partially absorbed by the inner sleeve 420 and any noise, vibration and harshness (NVH) is reduced on the outer surface of the motor portion and the proximate environment. This vibrational isolation reduces noise emitted from the motor portion 400 as the inner sleeve 420 acts as a damper for the stator 450 either through direct stator mounting or mounting through any added vibration isolator elastomer material sandwiched between stator and housing. One additional benefit is to collect all the internal leakages and flow back to the compressor to avoid external pipes and potential leakage risks. Since all the leakage is internal to the machine, the leakage it gets collected and flows to the main compressor Turning now to FIG. 5, an additional view of an exemplary electric motor portion 400 of a centrifugal compressor according to exemplary embodiments of the present disclosure is shown. The view is illustrative of the plurality of an interface between the motor portion 400 of FIG. 4 and the centrifugal compressor (not shown). The rotor shaft 520 is mechanically coupled to an impeller of the centrifugal compressor, wherein the impeller is rotated in response to the driving force of the electric motor. The exemplary electric motor portion 400 is further illustrative of a plurality of outlet flow passages 560. The flow rate and pressure of the refrigerant flowing through each of the inner flow passage and the outer flow passage can be metered by adjusting the cross sectional area of each of the outlet flow passages 560 along with other geometry of the inner and outer flow passages. The refrigerant from the outlet flow passages can be coupled to the inlet of the centrifugal compressor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An electric motor for driving a centrifugal compressor comprising:
   a motor housing having an inlet for receiving a refrigerant and a first outlet for coupling the refrigerant to the centrifugal compressor;
   an electric motor including a stator, a rotor and a shaft mechanically coupled to the rotor;
   an inner sleeve disposed within the motor housing for mechanically restraining the electric motor and wherein a flow passage is formed between an outer surface of the inner sleeve and an inner surface of the motor housing; and
   a flow deflector positioned within the motor housing to create a metered channel between the flow deflector and the inner sleeve such that a portion of the refrigerant flows within the inner sleeve and through the electric motor wherein the portion of the refrigerant exits the inner sleeve through a second outlet in the motor housing and where a flow rate of the portion of the refrigerant is regulated by a diameter of the second outlet in the motor housing.

2. The electric motor for driving a centrifugal compressor of claim 1 wherein the portion of the refrigerant exits the inner sleeve through a second outlet in the motor housing and is coupled to the centrifugal compressor.

3. The electric motor for driving a centrifugal compressor of claim 1 wherein the flow deflector is further configured as a trap to prevent a liquid refrigerant from accumulating inside the electric motor.

4. The electric motor for driving a centrifugal compressor of claim 1 wherein a flow rate of the portion of the refrigerant is regulated by a dimension of the metered channel.

5. The electric motor for driving a centrifugal compressor of claim 1 wherein the portion of the refrigerant flows between a first stator segment and a second stator segment.

6. The electric motor for driving a centrifugal compressor of claim 1 wherein the portion of the refrigerant flows within a gap between the stator and the rotor.

7. The electric motor for driving a centrifugal compressor of claim 1 wherein the shaft is mechanically coupled to an impeller for the centrifugal compressor and wherein the refrigerant and the portion of the refrigerant are coupled to an inlet of the centrifugal compressor.

8. The electric motor for driving a centrifugal compressor of claim 1 wherein the refrigerant is received from an evaporator via an inlet within the motor housing.

9. The electric motor for driving a centrifugal compressor of claim 1 wherein the centrifugal compressor is a component in an automotive air conditioning system.

10. A method of cooling an electric motor in a centrifugal compressor comprising:
  receiving a refrigerant flow from an evaporator into a motor housing;
  providing an inner sleeve within the motor housing for supporting the electric motor; and
  providing a metered channel within the inner sleeve such that a first portion of the refrigerant flow is routed through a first flow passage between an inner surface of the motor housing and an outer surface of the inner sleeve and a second portion of the refrigerant flow is routed into the inner sleeve and through the electric motor and wherein the second portion of the refrigerant flow is less than the first portion of the refrigerant flow.

11. The method of cooling an electric motor in a centrifugal compressor of claim 10 wherein the first portion of the refrigerant flow is coupled to an inlet of the centrifugal compressor via a first outlet in the motor housing and the second portion of the refrigerant flow is coupled to the centrifugal compressor via a second outlet in the motor housing.

12. The method of cooling an electric motor in a centrifugal compressor of claim 10 wherein a geometry of the metered channel determines a flow ratio between first portion of the refrigerant flow and the second portion of the refrigerant flow.

13. The method of cooling an electric motor in a centrifugal compressor of claim 10 wherein the metered channel is further configured as a trap to prevent a liquid refrigerant from accumulating inside the electric motor.

14. The method of cooling an electric motor in a centrifugal compressor of claim 10 wherein the electric motor is configured to drive an impeller of the centrifugal compressor and wherein the first portion of the refrigerant flow and the second portion of the refrigerant flow are coupled to an inlet of the centrifugal compressor.

15. The method of cooling an electric motor in a centrifugal compressor of claim 10 further including providing an outlet between an interior of the inner sleeve and wherein a geometry of the outlet determines a flow ratio between first portion of the refrigerant flow and the second portion of the refrigerant flow.

16. The method of cooling an electric motor in a centrifugal compressor of claim 10 wherein the second portion of the refrigerant flow is routed between a plurality of stator segments of the electric motor.

17. The method of cooling an electric motor in a centrifugal compressor of claim 10 wherein the second portion of the refrigerant flow is routed between a stator and a rotor of the electric motor.

18. The method of cooling an electric motor in a centrifugal compressor of claim 10 wherein the inner sleeve is configured to provide a vibration damping between the electric motor and the motor housing and wherein the metered channel is created by a gap between the inner sleeve and a flow deflector and wherein the inner sleeve and the flow deflector are mounted to opposite sides of the motor housing.

19. A centrifugal compressor comprising:
  an impeller disposed within an impeller housing for compressing a refrigerant;
  a motor housing mechanically coupled to the impeller housing, wherein the motor housing includes an inlet for receiving a refrigerant flow from an evaporator;
  an electric motor having a stator, a rotor and a shaft, wherein the shaft is mechanically coupled to the impeller and the rotor;
  an inner sleeve disposed within the motor housing for supporting the electric motor, wherein a first flow passage is formed between an inner surface of the motor housing and an outer surface of the inner sleeve;
  a flow deflector disposed within the motor housing such that a metered channel is formed between the inner sleeve and the flow deflector such that a first portion of the refrigerant flow is routed through the first flow passage and a second portion of the refrigerant flow is routed through the electric motor;
  a first outlet for coupling the first portion of the refrigerant flow from the first flow passage to the impeller housing; and
  a second outlet for coupling the second portion of the refrigerant flow from an interior volume of the inner sleeve to the impeller housing wherein a ratio of the first portion of the refrigerant flow and the second portion of the refrigerant flow is controlled in response to a geometry of the metered channel, a geometry of the first outlet and a geometry of the second outlet.

20. The centrifugal compressor of claim 19 wherein the flow deflector is further configured as a trap to prevent a liquid refrigerant from accumulating inside the electric motor.

* * * * *